(12) United States Patent
Wakabayashi et al.

(10) Patent No.: US 12,551,945 B2
(45) Date of Patent: *Feb. 17, 2026

(54) ADDITIVE MANUFACTURING POWDER AND ADDITIVELY MANUFACTURED BODY

(71) Applicant: SEIKO EPSON CORPORATION, Tokyo (JP)

(72) Inventors: Momoko Wakabayashi, Hachinohe (JP); Yasutaka Matsumoto, Suwa (JP)

(73) Assignee: SEIKO EPSON CORPORATION (JP)

( * ) Notice: Subject to any disclaimer, the term of this patent is extended or adjusted under 35 U.S.C. 154(b) by 43 days.

This patent is subject to a terminal disclaimer.

(21) Appl. No.: 18/188,189

(22) Filed: Mar. 22, 2023

(65) Prior Publication Data

US 2023/0302533 A1 Sep. 28, 2023

(30) Foreign Application Priority Data

Mar. 23, 2022 (JP) ................. 2022-046496

(51) Int. Cl.
*B22F 1/102* (2022.01)
*B22F 1/05* (2022.01)
*B33Y 70/10* (2020.01)

(52) U.S. Cl.
CPC ............... *B22F 1/102* (2022.01); *B22F 1/05* (2022.01); *B33Y 70/10* (2020.01); *B22F 2304/10* (2013.01)

(58) Field of Classification Search
None
See application file for complete search history.

(56) References Cited

U.S. PATENT DOCUMENTS

| | | | | |
|---|---|---|---|---|
| 6,451,082 B1* | 9/2002 | Ozaki | ................. | C22C 33/0207 |
| | | | | 419/65 |
| 7,604,678 B2* | 10/2009 | Poszmik | ................. | B22F 1/10 |
| | | | | 75/231 |
| 8,894,739 B1 | 11/2014 | Johnson et al. | | |
| 11,628,494 B2 | 4/2023 | Veregin et al. | | |
| 2010/0080957 A1* | 4/2010 | Chinn | .................... | C09D 5/086 |
| | | | | 427/256 |
| 2015/0125673 A1 | 5/2015 | Toyoda | | |
| 2015/0258705 A1 | 9/2015 | Hirata | | |
| 2016/0272833 A1 | 9/2016 | Toyoda | | |
| 2016/0288206 A1* | 10/2016 | Ohtaki | ................. | C04B 35/486 |

(Continued)

FOREIGN PATENT DOCUMENTS

EP 1160032 A1 12/2001
JP 2001-254102 A 9/2001

(Continued)

*Primary Examiner* — Seth Dumbris

(74) *Attorney, Agent, or Firm* — Harness, Dickey & Pierce, P.L.C.

(57) ABSTRACT

An additive manufacturing powder includes: a metal powder; and a film provided on a particle surface of the metal powder and containing a compound derived from a coupling agent having a hydrophobic functional group. An average particle diameter is 3.0 μm or more and 30.0 μm or less, and a contact angle of water measured at 25° C. by a θ/2 method, in a state where the additive manufacturing powder is subjected to a heating treatment at 200° C. for 24 hours in an air atmosphere and then laid in layers, is 80° or more and 150° or less.

5 Claims, 8 Drawing Sheets

(56) References Cited

U.S. PATENT DOCUMENTS

| | | | |
|---|---|---|---|
| 2018/0043431 A1* | 2/2018 | Araki | H01F 1/153 |
| 2018/0169760 A1 | 6/2018 | Negishi | |
| 2020/0306830 A1 | 10/2020 | Veregin et al. | |
| 2020/0377662 A1 | 12/2020 | Tobe et al. | |
| 2021/0027940 A1* | 1/2021 | Tadai | H01F 27/2823 |

FOREIGN PATENT DOCUMENTS

| | | |
|---|---|---|
| JP | 2005-191426 A | 7/2005 |
| JP | 2015-089929 A | 5/2015 |
| JP | 2015-171780 A | 10/2015 |
| JP | 2016-033971 A | 3/2016 |
| JP | 2017-025392 A | 2/2017 |
| JP | 2020-164808 A | 10/2020 |
| JP | 2020172674 A | 10/2020 |

\* cited by examiner

COMPARISON BETWEEN BENDING STRESSES OF
ADDITIVELY MANUFACTURED BODIES PREPARED
USING POWDERS IN EXAMPLE 1 AND COMPARATIVE EXAMPLE 1

ADDITIVE MANUFACTURING POWDER AND ADDITIVELY MANUFACTURED BODY

The present application is based on, and claims priority from JP Application Serial Number 2022-046496, filed Mar. 23, 2022, the disclosure of which is hereby incorporated by reference herein in its entirety.

BACKGROUND

1. Technical Field

The present disclosure relates to an additive manufacturing powder and an additively manufactured body.

2. Related Art

In recent years, as a technique for manufacturing a three-dimensional object, an additive manufacturing method using a metal powder has been widely used. This technique includes a step of calculating a cross-sectional shape of a three-dimensional object obtained by thinly slicing the three-dimensional object on a plane orthogonal to a laminating direction, a step of forming a powder layer by layering a metal powder, and a step of solidifying a part of the powder layer based on the shape obtained by the calculation. In this technique, the three-dimensional object is manufactured by repeating the step of forming a powder layer and the step of solidifying a part of the powder layer.

As the additive manufacturing method, a fused deposition molding (FDM) method, a selective laser sintering (SLS) method, a binder jetting method, and the like are known according to the principle of solidification.

As a modification of the selective laser sintering method, JP-A-2017-25392 discloses a method for producing an EB sintered 3D printer product using electron beams (EB) instead of lasers. According to this method, a metal molded product is produced by laminating a surface-treated metal powder for an EB sintered 3D printer, preheating the metal powder as desired, and then sintering the metal powder by EB irradiation. The surface-treated metal powder for the EB sintered 3D printer is a powder obtained by subjecting a surface of the metal powder produced by a known method to a surface treatment with a coupling agent. By using such a metal powder subjected to the surface treatment, conductivity during lamination is improved. Therefore, the metal powder can be suitably sintered by EB. Partial sintering due to preheating can also be prevented.

However, the surface-treated metal powder described in JP-A-2017-25392 has a problem in that fluidity decreases under a high temperature and a high humidity. When the fluidity of the surface-treated metal powder decreases, for example, when a powder layer is formed in a 3D printer, a filling property of the metal powder cannot be improved. Accordingly, a mechanical strength and a dimensional accuracy of an additively manufactured body may be reduced.

SUMMARY

An additive manufacturing powder according to an application example of the present disclosure includes:
  a metal powder; and
  a film provided on a particle surface of the metal powder and containing a compound derived from a coupling agent having a hydrophobic functional group, in which
  an average particle diameter is 3.0 μm or more and 30.0 μm or less, and
  a contact angle of water measured at 25° C. by a θ/2 method, in a state where the additive manufacturing powder is subjected to a heating treatment at 200° C. for 24 hours in an air atmosphere and then laid in layers, is 80° or more and 150° or less.

An additively manufactured body according to an application example of the present disclosure contains:
  the additive manufacturing powder according to the application example of the present disclosure; and
  a binder that binds particles of the additive manufacturing powder to each other.

DESCRIPTION OF EXEMPLARY EMBODIMENTS

Hereinafter, preferred embodiments of an additive manufacturing powder and an additively manufactured body according to the present disclosure will be described in detail with reference to the accompanying drawings.

1. Method for Producing Additively Manufactured Body

First, a method for producing the additively manufactured body will be described.

Figure 1:
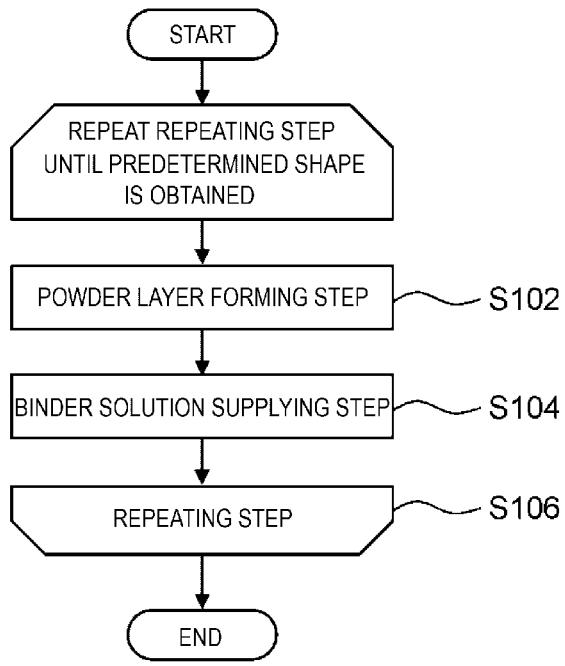
FIG. 1 is a process diagram showing a method for producing an additively manufactured body.

FIG. 1 is a process diagram showing the method for producing the additively manufactured body. FIGS. 2 to 10 are diagrams showing the method for producing the additively manufactured body shown in FIG. 1. In the drawings of the present application, an X axis, a Y axis, and a Z axis are set as three axes orthogonal to one another. Each axis is represented by an arrow, and a tip end side is referred to as a "plus side" and a base end side is referred to as a "minus side". In the following description, in particular, the plus side of the Z axis is referred to as "upper", and the minus side of the Z axis is referred to as "lower". In addition, both directions parallel to the X axis are referred to as an X axis direction, both directions parallel to the Y axis are referred to as a Y axis direction, and both directions parallel to the Z axis are referred to as a Z axis direction.

The method for producing the additively manufactured body shown in FIGS. 1 to 10 is a method called a binder jet method, and includes a powder layer forming step S102, a binder solution supplying step S104, and a repeating step S106 as shown in FIG. 1.

In the powder layer forming step S102, an additive manufacturing powder 1 is laid to form a powder layer 31. In the binder solution supplying step S104, a binder solution 4 is supplied to a predetermined region of the powder layer 31, and particles in the powder layer 31 are bound to each other to obtain a binding layer 41. In the repeating step S106, the powder layer forming step S102 and the binder solution supplying step S104 are repeated one or more times to obtain an additively manufactured body 6 shown in FIG. 10. Hereinafter, each step will be sequentially described.

1.1. Additive Manufacturing Device

First, prior to the description of the powder layer forming step S102, an additive manufacturing device 2 will be described.

The additive manufacturing device 2 includes a device main body 21 including a powder storage unit 211 and a manufacturing unit 212, a powder supply elevator 22 provided in the powder storage unit 211, a manufacturing stage 23 provided in the manufacturing unit 212, and a coater 24, a roller 25, and a liquid supply unit 26 provided movably on the device main body 21.

The powder storage unit 211 is a recessed portion provided in the device main body 21 and having an upper opening. The additive manufacturing powder 1 is stored in the powder storage unit 211. An appropriate amount of the additive manufacturing powder 1 stored in the powder storage unit 211 is supplied to the manufacturing unit 212 by the coater 24.

The powder supply elevator 22 is disposed at a bottom portion of the powder storage unit 211. The powder supply elevator 22 is movable in an upper-lower direction in a state where the additive manufacturing powder 1 is placed thereon. By moving the powder supply elevator 22 upward, the additive manufacturing powder 1 placed on the powder supply elevator 22 is pushed up and protruded from the powder storage unit 211. Accordingly, the protruded portion of the additive manufacturing powder 1 can be moved to the manufacturing unit 212 side.

The manufacturing unit 212 is a recessed portion provided in the device main body 21 and having an upper opening. The manufacturing stage 23 is disposed inside the manufacturing unit 212. The additive manufacturing powder 1 is laid in layers on the manufacturing stage 23 by the coater 24. The manufacturing stage 23 is movable in the upper-lower direction in a state where the additive manufacturing powder 1 is laid on the manufacturing stage 23. By appropriately setting a height of the manufacturing stage 23, an amount of the additive manufacturing powder 1 laid on the manufacturing stage 23 can be adjusted.

The coater 24 and the roller 25 are movable in the X axis direction from the powder storage unit 211 to the manufacturing unit 212. The coater 24 can level and lay the additive manufacturing powder 1 in layers by pulling the additive manufacturing powder 1. The roller 25 compresses the leveled additive manufacturing powder 1 from above.

The liquid supply unit 26 is implemented by, for example, an inkjet head or a dispenser, and is movable in the X axis direction and the Y axis direction in the manufacturing unit 212. The liquid supply unit 26 can supply a target amount of the binder solution 4 to a target position. The liquid supply unit 26 may include a plurality of dispense nozzles in one head. Then, the binder solution 4 may be dispensed from the plurality of dispense nozzles at the same time or with a time difference.

1.2. Powder Layer Forming Step

Figure 2:
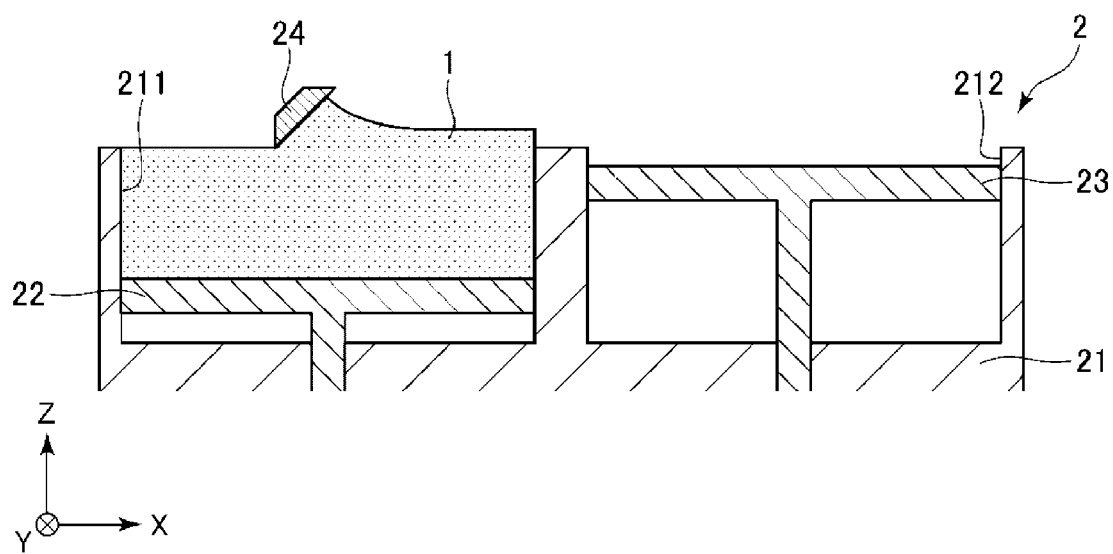
FIG. 2 is a diagram showing the method for producing the additively manufactured body shown in FIG. 1.
Figure 3:
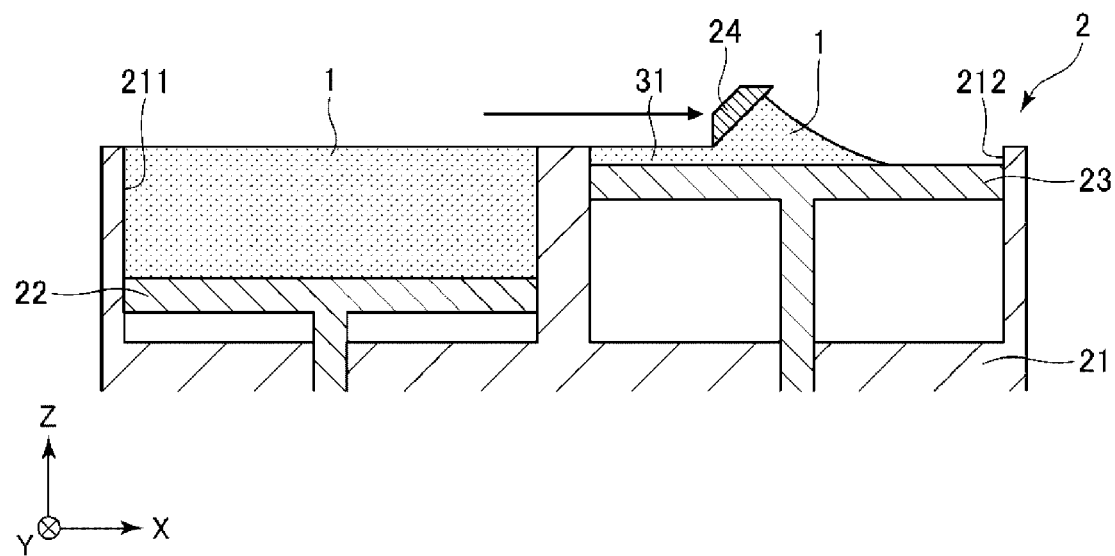
FIG. 3 is a diagram showing the method for producing the additively manufactured body shown in FIG. 1.
Figure 4:
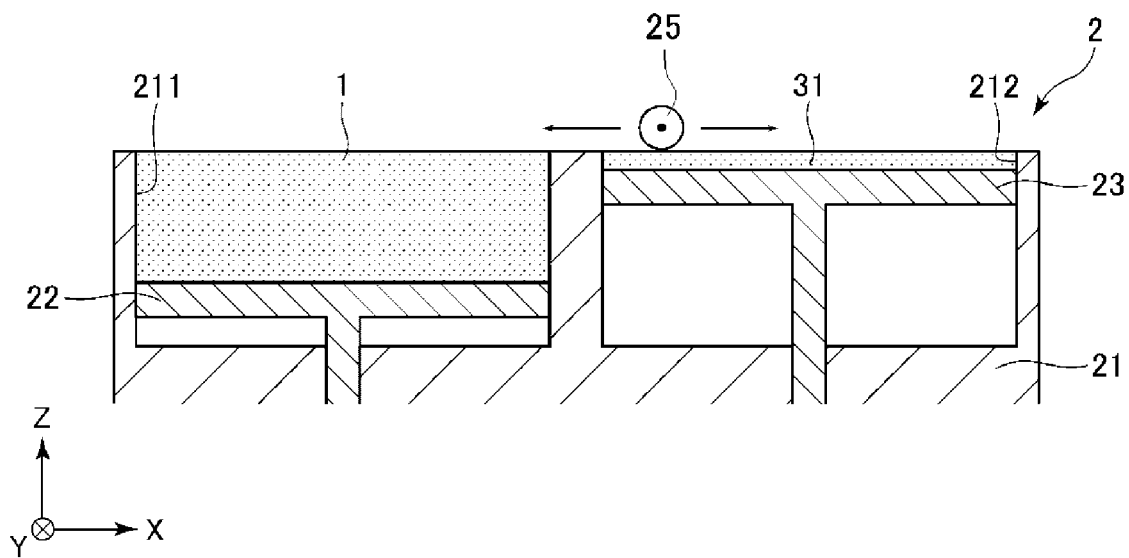
FIG. 4 is a diagram showing the method for producing the additively manufactured body shown in FIG. 1.

Next, the powder layer forming step S102 using the above-described additive manufacturing device 2 will be described. In the powder layer forming step S102, the additive manufacturing powder 1 is laid on the manufacturing stage 23 to form the powder layer 31. Specifically, as shown in FIGS. 2 and 3, the additive manufacturing powder 1 stored in the powder storage unit 211 is pulled onto the manufacturing stage 23 by using the coater 24, and leveled to a uniform thickness. Accordingly, the powder layer 31 shown in FIG. 4 is obtained. At this time, a thickness of the powder layer 31 can be adjusted by lowering an upper surface of the manufacturing stage 23 below an upper end of the manufacturing unit 212 and adjusting an amount by which the upper surface of the manufacturing stage 23 is lowered. As will be described later, the additive manufacturing powder 1 is a powder having an excellent filling property when leveled. Therefore, the powder layer 31 having a high filling rate can be obtained.

Next, the roller 25 is moved in the X axis direction while the powder layer 31 is compressed in a thickness direction by the roller 25. Accordingly, a filling rate of the additive manufacturing powder 1 in the powder layer 31 can be increased. The compression by the roller 25 may be performed as necessary, and may be omitted. In addition, the powder layer 31 may be compressed by a unit different from the roller 25, for example, a pressing plate.

1.3. Binder Solution Supplying Step

Figure 5:
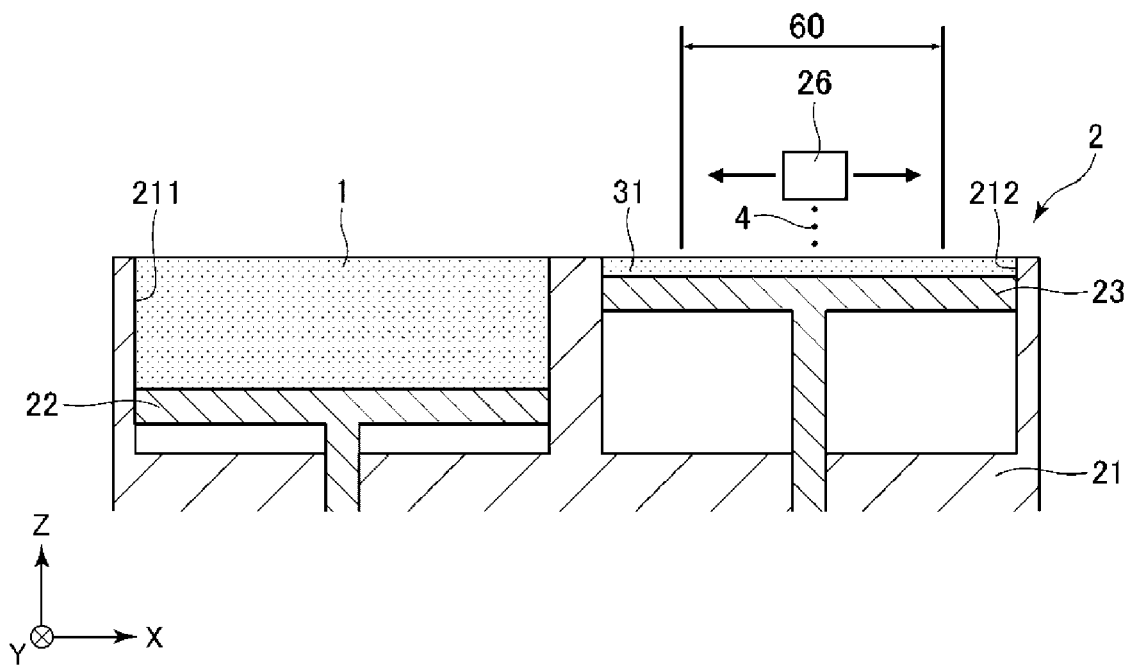
FIG. 5 is a diagram showing the method for producing the additively manufactured body shown in FIG. 1.
Figure 6:
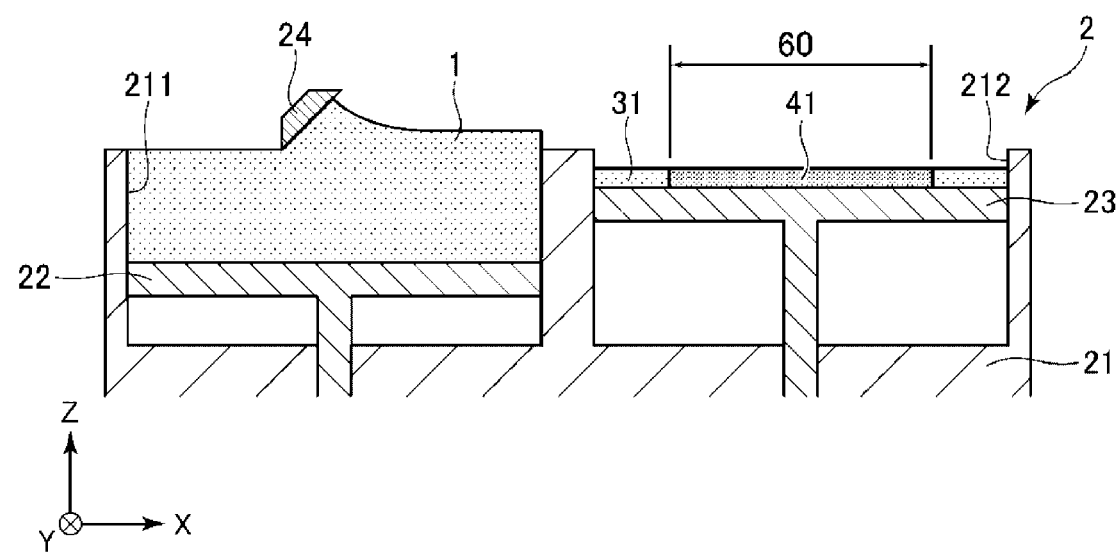
FIG. 6 is a diagram showing the method for producing the additively manufactured body shown in FIG. 1.

In the binder solution supplying step S104, as shown in FIG. 5, the liquid supply unit 26 supplies the binder solution 4 to a formation region 60 of the powder layer 31 corresponding to the additively manufactured body 6 to be manufactured. The binder solution 4 is a liquid containing a binder and a solvent or a dispersion medium. In the formation region 60 to which the binder solution 4 is supplied, the particles of the additive manufacturing powder 1 are bound to each other, and the binding layer 41 shown in FIG. 6 is obtained. In the binding layer 41, the particles of the additive manufacturing powder 1 are bound to each other by the binder, and have a shape retention property that is not broken due to own weights.

The binding layer 41 may be heated simultaneously with or after the supply of the binder solution 4. Accordingly, volatilization of the solvent or the dispersion medium contained in the binder solution 4 is promoted, and binding of the particles due to solidification or curing of the binder is promoted. When the binder contains a photocurable resin or an ultraviolet curable resin, light irradiation or ultraviolet irradiation may be performed instead of or in combination with heating.

A heating temperature during heating is not particularly limited, and is preferably 50° C. or higher and 250° C. or lower, and more preferably 70° C. or higher and 200° C. or lower. Accordingly, when the additive manufacturing powder 1 not bound by the binder solution 4 is reused, it is possible to prevent the additive manufacturing powder 1 from being denatured due to heating.

The binder solution 4 is not particularly limited as long as the binder solution 4 is a liquid having a component capable of binding the particles of the additive manufacturing powder 1 to each other. Examples of the solvent or the dispersion medium contained in the binder solution 4 include water, alcohols, ketones, and carboxylic acid esters, and the solvent or the dispersion medium may be a mixed liquid containing at least one of the above. In addition, examples of the binder contained in the binder solution 4 include fatty acids, paraffin wax, microwax, polyethylenes, polypropylenes, polystyrenes, acrylic resins, polyamide resins, polyesters, stearic acid, polyvinylpyrrolidone (PVP), polyvinyl alcohol (PVA), polyethylene glycol (PEG), urethane resins, epoxy resins, vinyl resins, unsaturated polyester resins, and phenol resins.

1.4. Repeating Step

Figure 10:
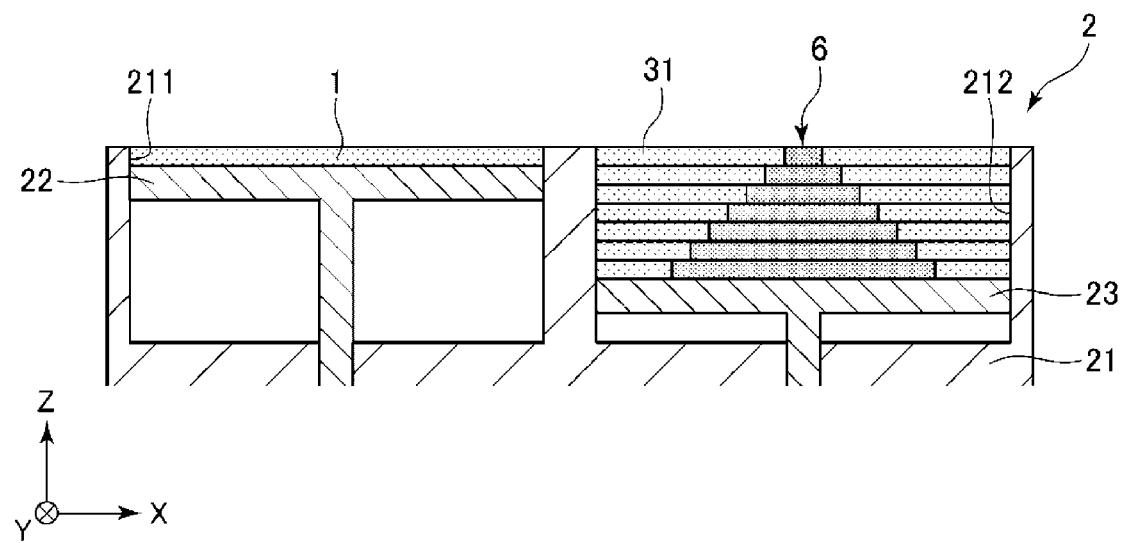
FIG. 10 is a diagram showing the method for producing the additively manufactured body shown in FIG. 1.

In the repeating step S106, the powder layer forming step S102 and the binder solution supplying step S104 are repeated one or more times until a laminate formed by laminating a plurality of binding layers 41 has a predetermined shape. That is, these steps are performed twice or more in total. Accordingly, the three-dimensional additively manufactured body 6 shown in FIG. 10 is obtained.

Figure 7:
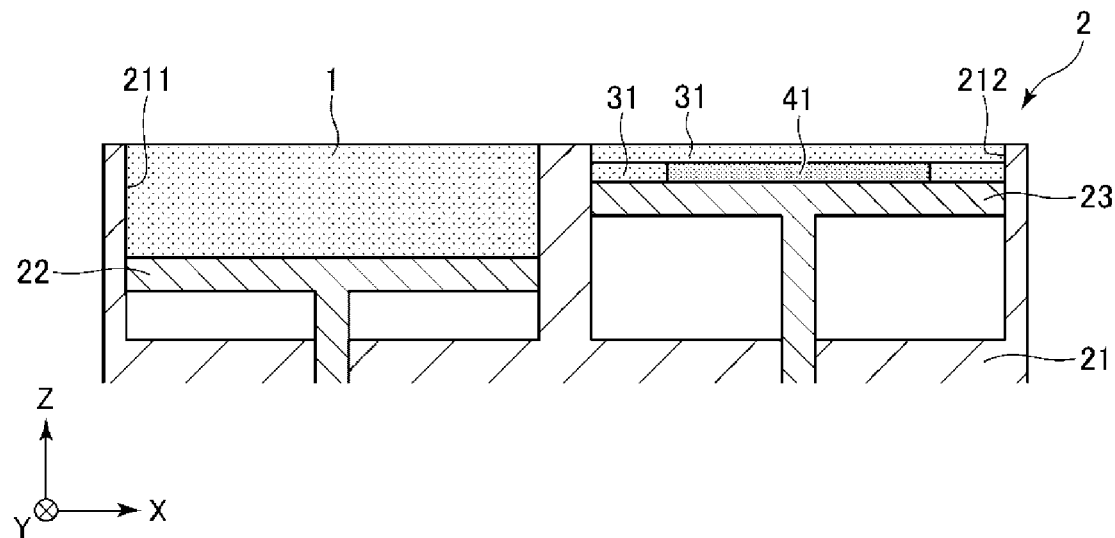
FIG. 7 is a diagram showing the method for producing the additively manufactured body shown in FIG. 1.
Figure 8:
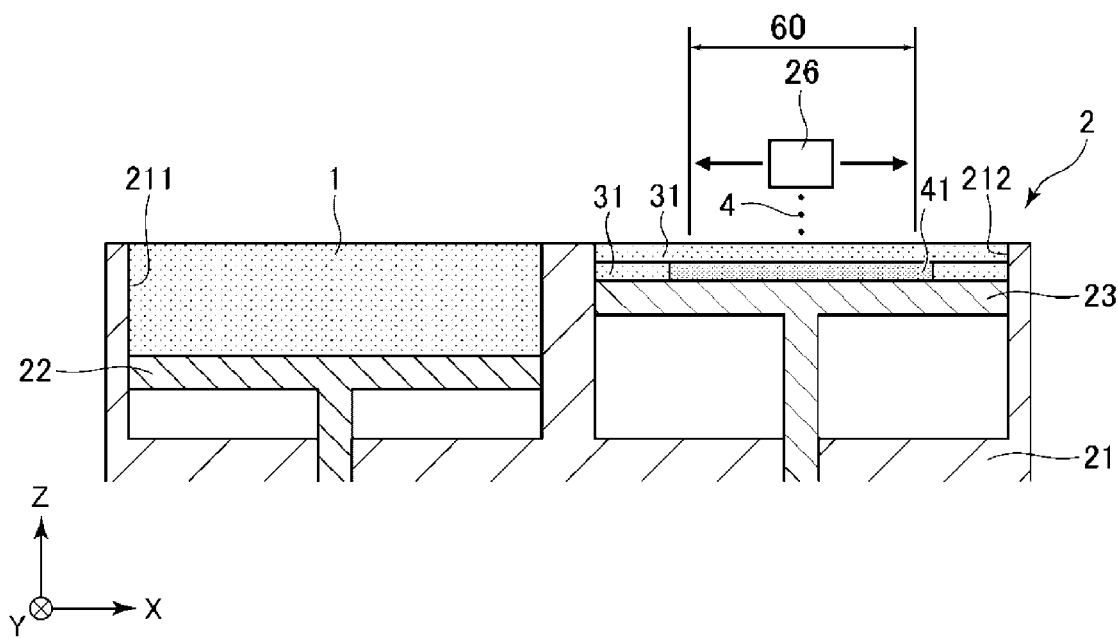
FIG. 8 is a diagram showing the method for producing the additively manufactured body shown in FIG. 1.
Figure 9:
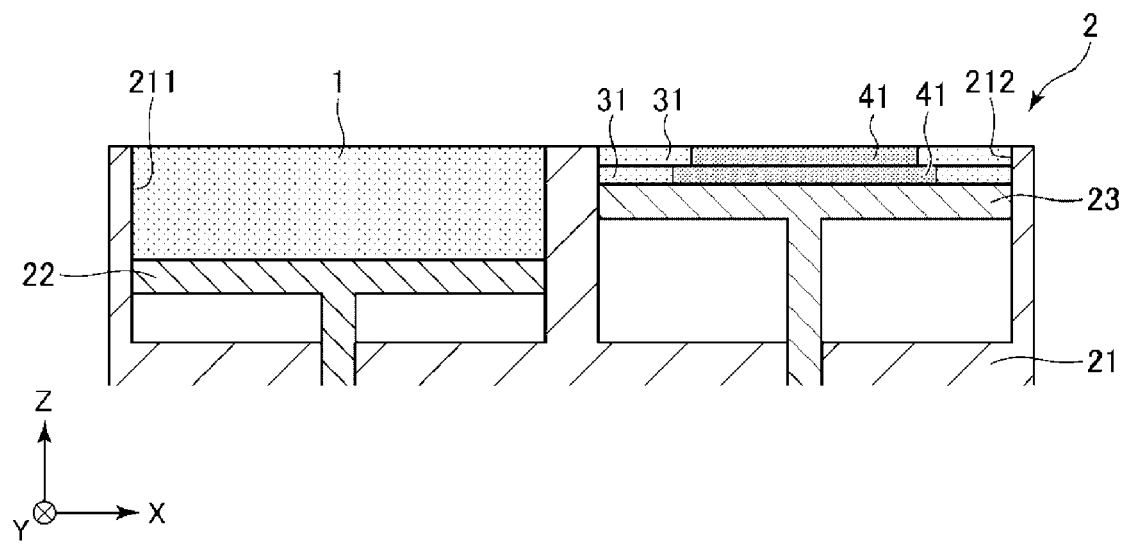
FIG. 9 is a diagram showing the method for producing the additively manufactured body shown in FIG. 1.

Specifically, first, as shown in FIG. 7, a new powder layer 31 is formed on the binding layer 41 shown in FIG. 6. Next, as shown in FIG. 8, the binder solution 4 is supplied to the formation region 60 of the newly formed powder layer 31. Accordingly, the binding layer 41 shown in FIG. 9 is obtained. By repeating these operations, the additively manufactured body 6 shown in FIG. 10 is obtained.

In the powder layer 31, the additive manufacturing powder 1 that does not constitute the binding layer 41 is collected and reused as necessary.

In addition, the obtained additively manufactured body 6 may be subjected to preliminary sintering as necessary. Accordingly, at least a part of the binder contained in the additively manufactured body 6 can be removed, and an abundance ratio of metal particles can be increased. As a result, when the additively manufactured body 6 is sintered to obtain a metal sintered body, a shrinkage rate can be lowered, and thus unintended deformation or the like can be prevented.

A temperature in the preliminary sintering is not particularly limited as long as the temperature in the preliminary sintering is a temperature at which at least a part of the binder is volatilized and the metal powder is not sintered, and the temperature is preferably 100° C. or higher and 500° C. or lower, and more preferably 150° C. or higher and 300° C. or lower. In addition, a time in the preliminary sintering is preferably 5 minutes or longer, more preferably 10 minutes or longer and 120 minutes or shorter, and still more preferably 20 minutes or longer and 60 minutes or shorter in the above temperature range. Examples of an atmosphere in the preliminary sintering include an air atmosphere, an inert atmosphere such as nitrogen or argon, and a reduced-pressure atmosphere obtained by reducing the pressure of these atmospheres.

1.5. Method for Producing Metal Sintered Body

The metal sintered body is obtained by performing a sintering treatment on the additively manufactured body 6. In the sintering treatment, the additively manufactured body 6 is heated to cause a sintering reaction.

A sintering temperature varies depending on a type, a particle diameter, or the like of the additive manufacturing powder 1. As an example, the sintering temperature is preferably 980° C. or higher and 1330° C. or lower, and more preferably 1050° C. or higher and 1260° C. or lower. In addition, a sintering time is preferably 0.2 hours or longer and 7 hours or shorter, and more preferably 1 hour or longer and 6 hours or shorter.

Examples of an atmosphere in the sintering treatment include a reducing atmosphere such as hydrogen, an inert atmosphere such as nitrogen and argon, and a reduced-pressure atmosphere obtained by reducing the pressure of these atmospheres. A pressure in the reduced-pressure atmosphere is not particularly limited as long as the pressure is less than normal pressure (100 kPa). The pressure is preferably 10 kPa or less, and more preferably 1 kPa or less.

The metal sintered body obtained as described above can be used as a material constituting all or a part of, for example, transportation equipment parts such as automobile parts, bicycle parts, railroad vehicle parts, ship parts, aircraft parts, and space transportation parts, electronic device parts such as personal computer parts, mobile phone terminal parts, tablet terminal parts, and wearable terminal parts, parts for electrical equipment such as refrigerators, washing machines, and air conditioners, machine parts such as machine tools and semiconductor manufacturing equipment, parts for plants such as nuclear power plants, thermal power plants, hydropower plants, refineries, and chemical complexes, watch parts, metal tableware, and ornaments such as jewelery and eyeglass frames.

2. Additive Manufacturing Powder

Next, the additive manufacturing powder according to the embodiment will be described.

Figure 11:
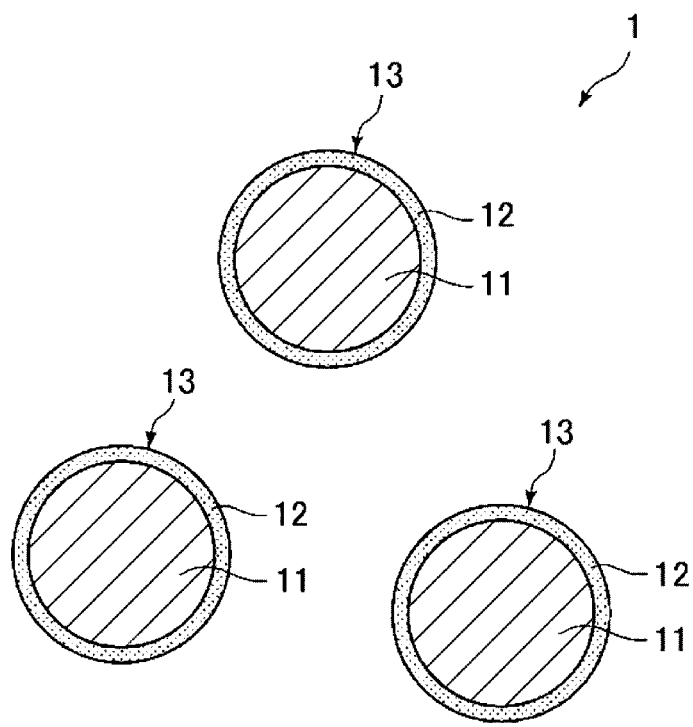
FIG. 11 is a cross-sectional view schematically showing an additive manufacturing powder according to an embodiment.

FIG. 11 is a cross-sectional view schematically showing the additive manufacturing powder according to the embodiment.

The additive manufacturing powder 1 according to the embodiment is a powder to be used in various additive manufacturing methods such as the binder jetting method described above.

As shown in FIG. 11, the additive manufacturing powder 1 contains a plurality of surface-coated particles 13, and each of the surface-coated particle 13 includes a metal particle 11 constituting the metal powder, and a film 12 covering a surface of the metal particle 11. Since the additive manufacturing powder 1 containing such surface-coated particles 13 has high fluidity, a filling property thereof when leveled is high.

2.1. Metal Particle

A constituent material of the metal particle 11 is not particularly limited, and may be any material as long as the constituent material has sinterability. Examples of the constituent material include simple substances such as Fe, Ni, Co, and Ti, alloys containing these simple substances as main components, and intermetallic compounds.

Examples of a Fe-based alloy include stainless steel such as austenite-based stainless steel, martensitic-based stainless steel, and precipitation hardening stainless steel, low carbon steel, carbon steel, heat resistant steel, die steel, high speed tool steel, a Fe—Ni alloy, and a Fe—Ni—Co alloy.

Examples of a Ni-based alloy include a Ni—Cr—Fe-based alloy, a Ni—Cr—Mo-based alloy, and a Ni—Fe-based alloy.

Examples of a Co-based alloy include a Co—Cr-based alloy, a Co—Cr—Mo-based alloy, and a Co—Al—W-based alloy.

Examples of a Ti-based alloy include alloys of Ti and metal elements such as Al, V, Nb, Zr, Ta, and Mo, and specific examples thereof include Ti-6Al-4V and Ti-6Al-7Nb.

2.2. Film

The film 12 is formed by reacting a coupling agent having a hydrophobic functional group with the surface of the metal particle 11. Therefore, the film 12 contains a compound derived from the coupling agent having a hydrophobic functional group, and exhibits a property derived from the hydrophobic functional group.

Examples of the hydrophobic functional group include a cyclic structure-containing group, a fluoroalkyl group, a fluoroaryl group, a nitro group, an acyl group, and a cyano group. Among these, the hydrophobic functional group is preferably a cyclic structure-containing group, a fluoroalkyl group, or a fluoroaryl group. These groups also impart particularly high heat resistance to the film 12. Accordingly, it is possible to implement the additive manufacturing powder 1 capable of maintaining good fluidity even after being heated to a high temperature.

The cyclic structure-containing group is a functional group having a cyclic structure. Examples of the cyclic structure-containing group include an aromatic hydrocarbon group, an alicyclic hydrocarbon group, and a cyclic ether group.

The aromatic hydrocarbon group is a residue obtained by removing hydrogen from aromatic hydrocarbon, and preferably has 6 to 20 carbon atoms. Examples of the aromatic hydrocarbon group include an aryl group, an alkylaryl group, an aminoaryl group, and a halogenated aryl group. Examples of the aryl group include a phenyl group, a tolyl group, a xylyl group, a naphthyl group, and an indenyl group. Examples of the alkylaryl group include a benzyl group, a methylbenzyl group, a phenethyl group, a methylphenethyl group, and a phenylbenzyl group.

The alicyclic hydrocarbon group is a residue obtained by removing hydrogen from alicyclic hydrocarbon, and preferably has 3 to 20 carbon atoms. Examples of the alicyclic hydrocarbon group include a cycloalkyl group and a cycloalkylalkyl group. Examples of the cycloalkyl group include a cyclopropyl group, a cyclobutyl group, a cyclopentyl group, and a cyclohexyl group. Examples of the cycloalkylalkyl group include a cyclopentylmethyl group and a cyclohexylmethyl group.

Examples of the cyclic ether group include an epoxy group, a 3,4-epoxycyclohexyl group, and an oxetanyl group.

The fluoroalkyl group is an alkyl group having 1 to 16 carbon atoms or a cycloalkyl group having 3 to 16 carbon atoms substituted with one or more fluorine atoms. In particular, the fluoroalkyl group is preferably a perfluoroalkyl group.

The fluoroaryl group is an aryl group having 6 to 20 carbon atoms substituted with one or more fluorine atoms. In particular, the fluoroaryl group is preferably a perfluoroaryl group.

These hydrophobic functional groups have relatively good heat resistance. Therefore, the film 12 containing a compound derived from a coupling agent having these hydrophobic functional groups is less likely to be denatured even in a high temperature environment. Therefore, the surface-coated particles 13 are less likely to aggregate even in a high temperature environment, and the fluidity thereof is less likely to decrease. As a result, it is possible to obtain the additive manufacturing powder 1, which can be laminated well and can be used to produce the additively manufactured body 6 having a high dimensional accuracy even when reused.

These hydrophobic functional groups also have good hydrophobicity. Therefore, the film 12 containing the compound derived from the coupling agent having these hydrophobic functional groups provides excellent fluidity to the additive manufacturing powder 1 even in a high humidity environment.

An average thickness of the film 12 is not particularly limited, and is preferably 100 nm or less, more preferably 0.5 nm or more and 50 nm or less, and still more preferably 1 nm or more and 10 nm or less. Accordingly, a film thickness required to maintain the film 12 can be secured. The average thickness of the film 12 is, for example, a value obtained by observing a particle cross section of the additive manufacturing powder 1 with a transmission electron microscope and averaging film thicknesses of the film 12 obtained from the observed image at five or more points.

The film 12 may be a multilayer film in which molecules of the above-described compound are laminated in a plurality of layers, for example, 2 layers or more and 10 layers or less, and preferably a monomolecular film containing the above-described compound. A thickness of the film 12 that is a monomolecular film can be minimized.

The monomolecular film is a film formed by self-assembly of the coupling agent. That is, molecules in the coupling agent, which have affinity for the surface of the metal particle 11, are densely aligned on the surface, and thus a film having a thickness equivalent to one molecule can be efficiently formed.

2.3. Various Properties

An average particle diameter of the additive manufacturing powder 1 according to the embodiment is 3.0 μm or more and 30.0 μm or less, preferably 4.0 μm or more and 15.0 μm or less, and more preferably 5.0 μm or more and 10.0 μm or less. By setting the average particle diameter of the additive manufacturing powder 1 within the above range, it is possible to obtain the additively manufactured body 6 from which a metal sintered body having a good surface roughness and a high dimensional accuracy can be produced. The average particle diameter of the additive manufacturing powder 1 is obtained from a cumulative distribution curve obtained by measuring a volume-based particle size distribution by, for example, a laser diffraction method. Specifically, in the cumulative distribution curve, a particle diameter D50 when a cumulative value from a small diameter side is 50% is defined as the average particle diameter.

Examples of a measuring device include Microtrack HRA9320-X100 manufactured by Nikkiso Co., Ltd.

A contact angle of water measured in a state where the additive manufacturing powder 1 according to the embodiment is subjected to a heating treatment at 200° C. for 24 hours in an air atmosphere and then laid in layers is 80° or more and 150° or less.

The additive manufacturing powder 1 exhibiting such a contact angle of water is a powder having high fluidity because of being less likely to absorb moisture and less likely to aggregate even in a high temperature environment or a high humidity environment despite of a small average particle diameter. Therefore, even when the additive manufacturing powder 1 is reused or exposed to a high temperature environment or a high humidity environment, the additive manufacturing powder 1 has an excellent filling property, and thus contributes to improvement in the mechanical strength and the dimensional accuracy of the additively manufactured body 6. Accordingly, it is possible to obtain the additively manufactured body 6 from which a metal sintered body having an excellent mechanical strength and a dimensional accuracy can be produced.

The additive manufacturing powder 1 having a contact angle of water within the above range has excellent affinity for the binder solution 4. Therefore, when the binder solution 4 is supplied after the additive manufacturing powder 1 is laid to form the powder layer 31, the binder solution 4 easily permeates the formation region 60 of the powder layer 31. Accordingly, the binder solution 4 can be uniformly permeated the formation region 60, and thus the additively manufactured body 6 having a high dimensional accuracy can be produced.

The contact angle of water in the additive manufacturing powder 1 can be measured by the following procedure. First, the additive manufacturing powder 1 is subjected to a heating treatment at 200° C. for 24 hours in the air atmosphere. Next, a double-sided tape is attached to a flat surface. Next, the additive manufacturing powder 1 subjected to the heating treatment is laid on the double-sided tape. Then, the laid additive manufacturing powder 1 is lightly pressed by a plate-shaped member. Next, excess additive manufacturing powder 1 is blown off by an air blower. Accordingly, a test piece for contact angle measurement is obtained.

Next, the contact angle of water of the test piece is measured by a θ/2 method using a contact angle measuring device Drop Master 500 manufactured by Kyowa Interface Science Co., Ltd. Measurement conditions are a temperature of 25° C. and a relative humidity of 50%±5%. A water dropping amount is 3 μL, and the measurement is performed 5 seconds after drop adhesion.

The contact angle of water measured for the additive manufacturing powder 1 laid in layers is 80° or more and 150° or less as described above, preferably 95° or more and 145° or less, and more preferably 110° or more and 140° or less. The contact angle of water may exceed the upper limit value, and in this case, since the hydrophobicity is too large, permeability of the binder solution 4 may decrease depending on the composition of the binder solution 4. Accordingly, homogeneity of the additively manufactured body 6 may decrease.

When the volume-based particle size distribution of the additive manufacturing powder 1 is measured by the laser diffraction method to obtain the cumulative distribution curve, in the obtained cumulative distribution curve, a particle diameter when the cumulative value from the small diameter side is 10% is defined as D10, and a particle diameter when the cumulative value from the small diameter side is 90% is defined as D90. At this time, (D90−D10)/D50 of the additive manufacturing powder 1 is preferably about 1.0 or more and 2.7 or less, and more preferably about 1.2 or more and 2.4 or less. (D90−D10)/D50 is an index indicating a degree of expansion of the particle size distribution, and when the index is within the above range, the filling property of the additive manufacturing powder 1 is particularly good.

When the additive manufacturing powder 1 according to the embodiment is heated in the air at 200° C. for 24 hours, a decrease rate in bulk density with respect to a bulk density before heating is preferably 2.5% or less, more preferably 2.0% or less, and still more preferably 1.0% or less. Accordingly, when the additive manufacturing powder 1 that is not bound in the above-described additive manufacturing method is reused, the denaturation due to heating is sufficiently prevented. As a result, even when the reused additive manufacturing powder 1 and a newly added additive manufacturing powder 1 are mixed, a difference in fluidity between the two additive manufacturing powders 1 can be reduced. Therefore, the additive manufacturing powder 1 whose decrease rate in bulk density is within the above range is suitable for reuse. Such an effect is a result of imparting good heat resistance to the film 12 by the hydrophobic functional group described above.

The bulk density of the additive manufacturing powder 1 is measured by a method for measuring an apparent density of a metal powder specified in JIS Z 2504:2012. The decrease rate in bulk density with respect to the bulk density before heating is obtained as a quotient by measuring a decrease amount between the bulk density before heating and the bulk density after heating, and then dividing the decrease amount by the bulk density before heating. Therefore, when the bulk density increases after heating, the decrease rate is zero.

Similarly, when the additive manufacturing powder 1 according to the embodiment is heated in the air at 200° C. for 24 hours, a decrease rate in tap density with respect to a tap density before heating is preferably 10.0% or less, more preferably 5.0% or less, and still more preferably 2.5% or less. Accordingly, when the additive manufacturing powder 1 that is not bound in the above-described additive manufacturing method is reused, the denaturation due to heating is sufficiently prevented. As a result, even when the reused additive manufacturing powder 1 and a newly added additive manufacturing powder 1 are mixed, a difference in fluidity between the two additive manufacturing powders 1 can be reduced. Therefore, the additive manufacturing powder 1 whose decrease rate in tap density is within the above range is particularly suitable for reuse.

The tap density of the additive manufacturing powder 1 is measured by Powder Tester (registered trademark) PT-X, which is a powder property evaluation device and manufactured by Hosokawa Micron Corporation. The decrease rate in tap density with respect to the tap density before heating is obtained as a quotient by measuring a decrease amount between the tap density before heating and a tap density after heating, and then dividing the decrease amount by the tap density before heating. Therefore, when the tap density increases after heating, the decrease rate is zero.

In the additive manufacturing powder 1 according to the embodiment, a moisture content measured by a Karl Fischer method is preferably 150 ppm or less, more preferably 10 ppm or more and 120 ppm or less, and still more preferably 30 ppm or more and 100 ppm or less in terms of mass ratio. When the moisture content of the additive manufacturing powder 1 is within the above range, the additive manufacturing powder 1 is particularly unlikely to aggregate. Therefore, the fluidity and the filling property of the additive manufacturing powder 1 can be particularly improved. In addition, since rusting of the metal particles 11 due to moisture can be prevented, a metal sintered body having an excellent mechanical strength and appearance can be obtained.

For the measurement of the moisture content by the Karl Fischer method, for example, a moisture measuring device CA-310 manufactured by Nitto Seiko Analytech Co., Ltd. is used.

In the additive manufacturing powder 1 according to the embodiment, when additive manufacturing is performed using a water-soluble resin as a binder, a bending stress of the obtained additively manufactured body is preferably 15 $N/cm^2$ (0.15 MPa) or more, and more preferably 20 $N/cm^2$ (0.20 MPa) or more. With such an additive manufacturing powder 1, an additively manufactured body having a sufficiently high bending stress can be produced. Accordingly, the mechanical strength of the metal sintered body obtained by sintering the additively manufactured body can be increased. In addition, when the mechanical strength of the metal sintered body is sufficiently high and further improvement is not necessary, the used amount of the binder during manufacturing can be reduced. Accordingly, it is possible to reduce an amount of shrinkage of the additively manufactured body during debindering and sintering. As a result, the dimensional accuracy of the metal sintered body obtained by sintering the additively manufactured body can be improved.

2.4. Effects of Embodiment

As described above, the additive manufacturing powder 1 according to the embodiment includes particles of the metal powder (the metal particles 11) and the films 12 provided on the surfaces of the metal particles 11. The films 12 contain the compound derived from the coupling agent having a hydrophobic functional group.

The average particle diameter of the additive manufacturing powder 1 is 3.0 μm or more and 30.0 μm or less. In a state where the additive manufacturing powder 1 is subjected to the heating treatment at 200° C. for 24 hours in the air atmosphere and then laid in layers, the contact angle of water measured at 25° C. by the θ/2 method is 80° or more and 150° or less.

The additive manufacturing powder 1 is less likely to absorb moisture and is less likely to aggregate even in a high temperature environment or a high humidity environment despite of a small average particle diameter, and thus has high fluidity. Therefore, even when the additive manufacturing powder 1 is reused or exposed to a high temperature environment or a high humidity environment, the additive manufacturing powder 1 has an excellent filling property and thus contributes to improvement in the mechanical strength and the dimensional accuracy of the additively manufactured body 6. The additive manufacturing powder 1 having a contact angle of water within the above range has excellent affinity for the binder solution 4. Therefore, the binder solution 4 easily permeates the formation region 60 of the powder layer 31, and the additively manufactured body 6 having a high dimensional accuracy can be produced. According to such an additively manufactured body 6, it is possible to produce a metal sintered body having an excellent mechanical strength and an excellent dimensional accuracy.

As described above, the hydrophobic functional group is preferably a cyclic structure-containing group, a fluoroalkyl group, or a fluoroaryl group. These hydrophobic functional groups impart not only hydrophobicity but also heat resistance to the film 12. Accordingly, it is possible to implement the additive manufacturing powder 1 capable of maintaining good fluidity even after being heated to a high temperature.

As described above, when the additive manufacturing powder 1 is heated at 200° C. for 24 hours in the air atmosphere, the decrease rate in bulk density is preferably 2.5% or less with respect to the bulk density before heating. Accordingly, when the additive manufacturing powder 1 that is not bound in the additive manufacturing method is reused, the denaturation due to heating is sufficiently prevented. As a result, even when the reused additive manufacturing powder 1 and a newly added additive manufacturing powder 1 are mixed, a difference in fluidity between the two additive manufacturing powders 1 can be reduced.

As described above, the film 12 is preferably a monomolecular film containing the compound described above. The thickness of the film 12 that is a monomolecular film can be minimized.

As described above, in the additive manufacturing powder 1, the moisture content measured by the Karl Fischer method is preferably 150 ppm or less in terms of mass ratio. Accordingly, the additive manufacturing powder 1 is particularly less likely to aggregate. Therefore, the fluidity and the filling property of the additive manufacturing powder 1 can be particularly improved.

As described above, in the additive manufacturing powder 1, when additive manufacturing is performed using a water-soluble resin as a binder, the bending stress of the obtained additively manufactured body is preferably 15 $N/cm^2$ (0.15 MPa) or more. Accordingly, it is possible to produce an additively manufactured body having a sufficiently high bending stress, and to reduce the used amount of the binder during manufacturing.

As described above, the additively manufactured body 6 according to the embodiment contains the additive manufacturing powder 1 and the binder that binds the particles of the additive manufacturing powder 1 to each other. Such an additively manufactured body 6 has a high dimensional accuracy and a high mechanical strength by benefiting from the high fluidity and filling property of the additive manufacturing powder 1. Therefore, by sintering the additively manufactured body 6, a metal sintered body having a high dimensional accuracy and a high mechanical strength can be obtained.

3. Method for Producing Additive Manufacturing Powder

Next, the method for producing the additive manufacturing powder will be described.

Figure 12:
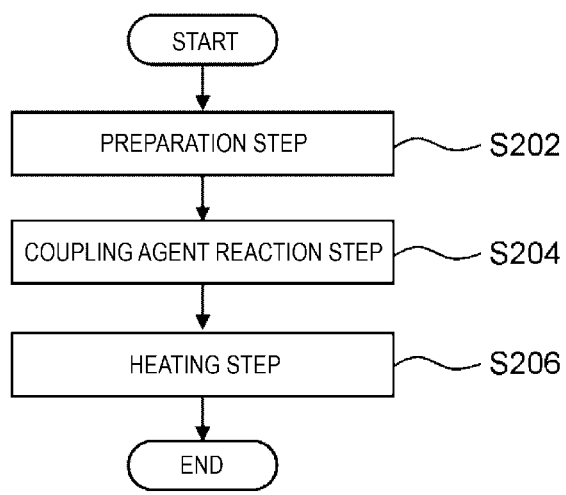
FIG. 12 is a process diagram showing a method for producing the additive manufacturing powder.

FIG. 12 is a process diagram showing the method for producing the additive manufacturing powder.

The method for producing the additive manufacturing powder shown in FIG. 12 includes a preparation step S202, a coupling agent reaction step S204, and a heating step S206.

3.1. Preparation Step

In the preparation step S202, a metal powder containing the metal particles 11 is prepared. The metal particles 11 may be produced by any method, are preferably a powder produced by an atomizing method such as a water atomizing method, a gas atomizing method, or a rotating water flow atomizing method, and are more preferably a powder produced by the water atomizing method or the rotating water flow atomizing method. The surfaces of the metal particles 11 produced by these methods are easily covered with hydroxy groups derived from water. Therefore, adhesion of the film 12 can be improved, and fluidity of the surface-coated particle 13 can be sufficiently improved even when the film 12 is thin. As a result, it is possible to implement the additively manufactured body 6 in which an occupancy rate of the metal particle 11 is higher than that of the film 12 and the shrinkage rate during sintering is small.

3.2. Coupling Agent Reaction Step

In the coupling agent reaction step S204, the coupling agent having a hydrophobic functional group is reacted with the metal powder. Accordingly, the coupling agent adheres the surfaces of the metal particles 11.

Examples of this operation include the following three operations.

An example of a first operation is an operation of charging both the metal particles 11 and the coupling agent into a chamber and then heating the inside of the chamber.

An example of a second operation is an operation of charging the metal particles 11 into a chamber and then spraying the coupling agent into the chamber while stirring the metal particles 11.

An example of a third operation is an operation of charging water, a coupling agent, and an alkaline solution such as ammonia or sodium hydroxide into a primary alcohol such as methanol, ethanol, or isopropyl alcohol, and stirring, filtering, and drying the mixture.

Examples of the coupling agent include a silane coupling agent, a titanium coupling agent, and a zirconium coupling agent.

The following chemical formula is an example of a molecular structure of the silane coupling agent.

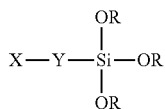

In the above formula, X represents a functional group, Y represents a spacer, and OR represents a hydrolyzable group. R represents, for example, a methyl group, or an ethyl group.

Examples of the spacer include an alkylene group, an arylene group, an aralkylene group, and an alkylene ether group.

Examples of the hydrolyzable group include an alkoxy group, a halogen atom, a cyano group, an acetoxy group, and an isocyanate group. In a case of the alkoxy group, silanol is generated by hydrolysis. The silanol reacts with the hydroxy group generated on the surface of the metal particle 11, and the coupling agent adheres to the surface of the metal particle 11.

The coupling agent may contain at least one hydrolyzable group, and preferably contains two or more hydrolyzable groups, and more preferably contains three hydrolyzable groups as shown in the above formula. For example, the coupling agent in which the hydrolyzable group is an alkoxy group preferably contains a dialkoxy group, and more preferably contains a trialkoxy group. The coupling agent containing a trialkoxy group (coupling agent containing three hydrolyzable groups) reacts with three hydroxy groups generated on the surface of the metal particle 11. Therefore, the film 12 derived from the coupling agent has good adhesion to the metal particle 11. Since the coupling agent containing a trialkoxy group is also excellent in film forming property, it is possible to obtain the film 12 having excellent continuity. Such a film 12 contributes to further increasing the fluidity of the additive manufacturing powder 1.

In the coupling agent containing a trialkoxy group, even when the hydrophobic functional group is thermally decomposed after the film 12 is formed, the remaining part can continue covering the surface of the metal particle 11. Specifically, when the hydrophobic functional group is thermally decomposed, a hydroxy group bound to a Si atom is generated instead of the hydrophobic functional group. The number of the hydroxy groups is smaller than the number of the hydroxy groups initially generated on the surface of the metal particle 11.

Figure 13:
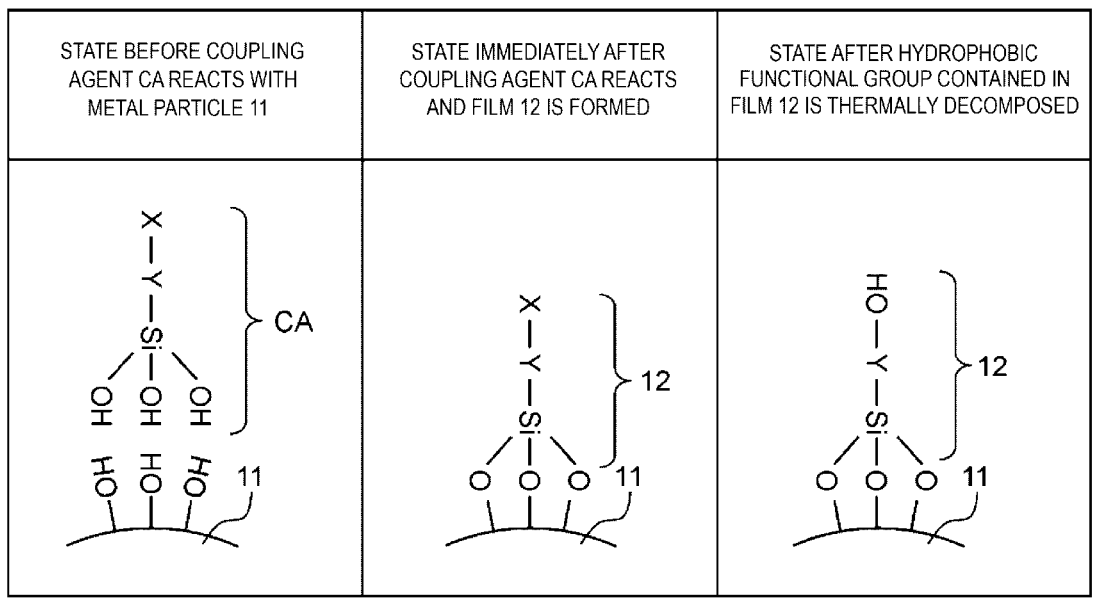
FIG. 13 is a table schematically showing a state after a coupling agent containing a trialkoxy group is hydrolyzed and before the coupling agent reacts with a hydroxy group generated on a surface of a metal particle, a state immediately after the coupling agent reacts, and a state after a hydrophobic functional group contained in a film is thermally decomposed.

FIG. 13 is a table schematically showing a state after a coupling agent CA containing a trialkoxy group is hydrolyzed and before the coupling agent CA reacts with the hydroxy group generated on the surface of the metal particle 11, a state immediately after the coupling agent CA reacts, and a state after the hydrophobic functional group contained in the film 12 is thermally decomposed.

As shown in FIG. 13, the coupling agent CA containing a trialkoxy group adheres to the surface of the metal particle 11 by the trialkoxy group reacting with the three hydroxy groups generated on the surface of the metal particle 11, that is, hydrogen bonding. Thereafter, in the heating step S206 to be described later, a dehydration condensation reaction is caused by heating, a covalent bond is generated, and thus the film 12 is obtained. When the hydrophobic functional group is thermally decomposed by heating, a hydroxy group is generated after the hydrophobic functional group is thermally decomposed. As a result, the number of the hydroxy groups generated on the film 12 can be made smaller than that of the hydroxy groups initially generated on the surface of the metal particle 11. Therefore, by forming the film 12, moisture resistance (hydrophobicity) can be maintained even when the hydrophobic functional group is thermally decomposed.

As described above, examples of the hydrophobic functional group contained in the coupling agent include a cyclic structure-containing group, a fluoroalkyl group, and a fluoroaryl group.

Among these, as described above, examples of the coupling agent having a cyclic structure-containing group include a coupling agent having an aromatic hydrocarbon group and a coupling agent having a cyclic ether group.

Examples of the coupling agent having an aromatic hydrocarbon group include phenyltrimethoxysilane represented by the following formula (A-1)

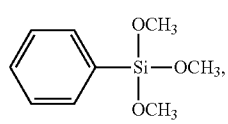

phenyltriethoxysilane represented by the following formula (A-2)

dimethoxydiphenylsilane represented by the following formula (A-3)

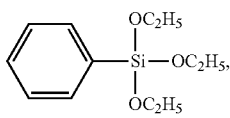
(A-3)

2,2-dimethoxy-1-phenyl-1-aza-2-silacyclopentane represented by the following formula (A-4)

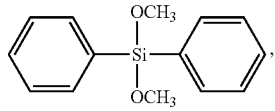
(A-4)

3-phenoxypropyltrichlorosilane represented by the following formula (A-11)

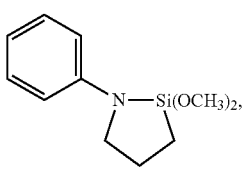
(A-11)

phenyltriacetoxysilane represented by the following formula (A-12)

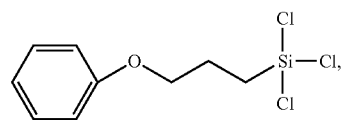
(A-12)

triethoxy(p-tolyl)silane represented by the following formula (A-13)

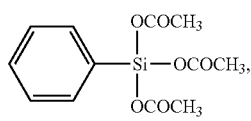
(A-13)

p-aminophenyltrimethoxysilane represented by the following formula (A-14)

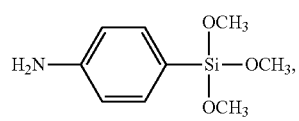
(A-14)

m-aminophenyltrimethoxysilane represented by the following formula (A-15)

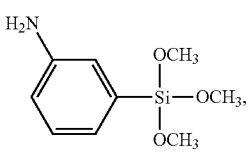
(A-15)

and
((chloromethyl)phenylethyl)trimethoxysilane represented by the following formula (A-16)

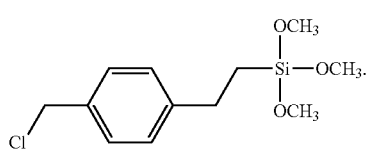
(A-16)

Examples of the coupling agent having a cyclic ether group include
3-glycidoxypropylmethyldimethoxysilane represented by the following formula (A-5)

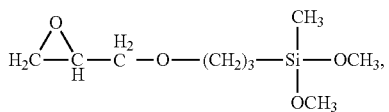
(A-5)

3-glycidoxypropyltrimethoxysilane represented by the following formula (A-6)

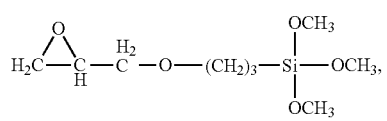
(A-6)

3-glycidoxypropylmethyldiethoxysilane represented by the following formula (A-7)

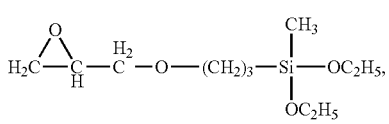
(A-7)

and
3-glycidoxypropyltriethoxysilane represented by the following formula (A-8)

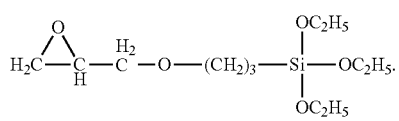

(A-8)

Examples of the coupling agent having a fluoroalkyl group include trimethoxy(3,3,3-trifluoropropyl)silane represented by the following formula (B-1)

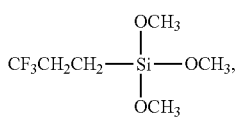

(B-1)

trimethoxy(1H,1H,2H,2H-tridecafluoro-n-octyl)silane represented by the following formula (B-2)

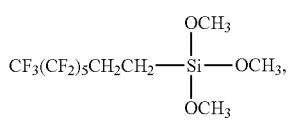

(B-2)

and trimethoxy(1H,1H,2H,2H-nonafluorohexyl)silane represented by the following formula (B-3)

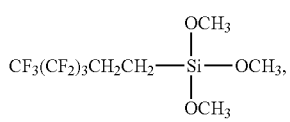

(B-3)

Examples of the coupling agent having a fluoroaryl group include trimethoxy(11-pentafluorophenoxyundecyl)silane represented by the following formula (C-1)

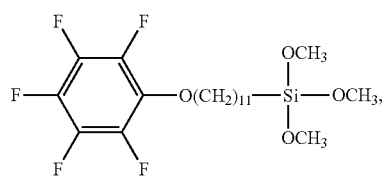

(C-1)

and pentafluorophenyldimethylchlorosilane represented by the following formula (C-2)

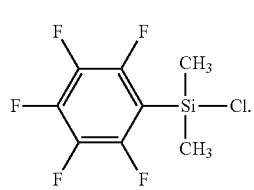

(C-2)

An adding amount of the coupling agent is not particularly limited, and is preferably 0.01 mass % or more and 1.00 mass % or less, and more preferably 0.05 mass % or more and 0.50 mass % or less, with respect to the metal particles 11.

The coupling agent is supplied by a method such as standing in a chamber and spraying into a chamber.

3.3. Heating Step

In the heating step S206, the metal particles 11 to which the coupling agent adheres are heated. Accordingly, the films 12 are formed at the surfaces of the metal particles 11, and the additive manufacturing powder 1 is obtained. By heating, the unreacted coupling agent can be removed.

A heating temperature for the metal particles 11 to which the coupling agent adheres is not particularly limited, and is preferably 50° C. or higher and 300° C. or lower, and more preferably 100° C. or higher and 250° C. or lower. A heating time is preferably 10 minutes or longer and 24 hours or shorter, and more preferably 30 minutes or longer and 10 hours or shorter. Examples of an atmosphere of the heating treatment include an air atmosphere and an inert gas atmosphere.

Although the additive manufacturing powder and the additively manufactured body according to the present disclosure have been described above based on the illustrated embodiment, the present disclosure is not limited thereto, and for example, the additive manufacturing powder and the additively manufactured body according to the present disclosure may be those in which any component is added to the above-described embodiment.

EXAMPLES

Next, specific examples of the present disclosure will be described.

4. Production of Additive Manufacturing Powder

4.1. Example 1

First, a powder of precipitation hardening stainless steel 17-4PH produced by a water atomizing method was prepared. Then, 100 g of the prepared metal powder was pretreated. Next, a solution in which the coupling agent and water were mixed was prepared, and then the solution was sprayed onto the metal powder heated to 200° C. by spray coating. Thereafter, the metal powder to which the solution was sprayed was dried as it was. A using amount of the coupling agent was 0.1 mass % of the metal powder. In this way, an additive manufacturing powder was obtained.

Thereafter, the obtained additive manufacturing powder was laid in layers to prepare a test piece, and a contact angle of water was measured for the test piece. Then, the measured value was classified into any one of A to D based on the following classification criteria.

19

A: The contact angle is 110° or more.
B: The contact angle is 95° or more and less than 110°.
C: The contact angle is 80° or more and less than 95°.
D: The contact angle is less than 80°.

The classification results are shown in Table 1 as "contact angle of water before heating treatment". Pure water was used as water, and the measurement temperature was 25° C.

Next, the additive manufacturing powder was subjected to a heating treatment at 200° C. for 24 hours in an air atmosphere. Next, the additive manufacturing powder subjected to the heating treatment was laid in layers to prepare a test piece, and then the contact angle of water was measured again for the test piece. Then, the measured value was classified into any one of A to D based on the classification criteria described above. The classification results are shown in Table 1 as "contact angle of water after heating treatment".

A moisture content of the obtained additive manufacturing powder was measured. Further, the particle diameters D10, D50, and D90 of the obtained additive manufacturing powder were obtained. The particle diameter D50 was 7 μm. Then, (D90−D10)/D50 was calculated. The measured moisture content and the calculated (D90−D10)/D50 are shown in Table 1.

4.2. Examples 2 to 6

Additive manufacturing powders were obtained in the same manner as in Example 1 except that production conditions for the additive manufacturing powders were changed as shown in Table 1. The particle diameter D50 of the metal powder used was 3 μm to 15 μm.

4.3. Comparative Examples 1 to 7

Additive manufacturing powders were obtained in the same manner as in Example 1 except that production conditions for the additive manufacturing powders were changed as shown in Table 1. The particle diameter D50 of the metal powder used was 3 μm to 15 μm. Symbols of chemical formulas shown in Table 1 correspond to the following compounds.

D-1: methyltrimethoxysilane
D-2: propyltrimethoxysilane
D-3: decyltrimethoxysilane
D-4: octadecyltrimethoxysilane
D-5: vinyltrimethoxysilane
D-6: aminotrimethoxysilane

TABLE 1

| | | Production condition for additive manufacturing powder | | | | | | |
|---|---|---|---|---|---|---|---|---|
| | | Coupling agent | | | | Before heating treatment | | After heating treatment |
| | Film | Functional group | Hydrolyzable group | Chemical formula | Moisture content ppm | (D90 − D10)/D50 | Contact angle | Contact angle |
| Example 1 | Presence | Phenyl group | Trimethoxy group | A-1 | 60 | 1.3 | A | A |
| Example 2 | Presence | Phenyl group | Triethoxy group | A-2 | 60 | 1.4 | A | A |
| Example 3 | Presence | Phenyl group | Dimethoxy group | A-3 | 120 | 1.8 | A | B |
| Example 4 | Presence | Epoxy group | Trimethoxy group | A-6 | 100 | 1.5 | A | C |
| Example 5 | Presence | Fluoroalkyl group | Trimethoxy group | B-1 | 50 | 1.2 | A | A |
| Example 6 | Presence | Fluorophenyl group | Trimethoxy group | C-1 | 50 | 1.1 | A | A |
| Comparative Example 1 | Absence | — | — | — | 180 | 2.2 | D | D |
| Comparative Example 2 | Presence | Methyl group | Trimethoxy group | D-1 | 120 | 1.6 | A | D |
| Comparative Example 3 | Presence | Propyl group | Trimethoxy group | D-2 | 100 | 1.8 | A | D |
| Comparative Example 4 | Presence | Decyl group | Trimethoxy group | D-3 | 60 | 1.9 | A | D |
| Comparative Example 5 | Presence | Octadecyl group | Trimethoxy group | D-4 | 60 | 2.0 | A | D |
| Comparative Example 6 | Presence | Vinyl group | Trimethoxy group | D-5 | 100 | 1.6 | A | D |
| Comparative Example 7 | Presence | Amino group | Trimethoxy group | D-6 | 120 | 1.9 | A | D |

5. Evaluation of Additive Manufacturing Powder and Additively Manufactured Body

5.1. Filling Property

In a 50 mL screw cap bottle, 50 g of each of the powders in Examples and Comparative Examples was added. Then, with the screw cap bottle being erected, a height from a bottom surface to an upper surface of the powder was measured, and a filling property of the powder was evaluated according to the height. This filling property was evaluated in light of the following evaluation criteria.

A: The height is 25 mm or less.
B: The height is more than 25 mm and 30 mm or less.
C: The height is more than 30 mm.

Next, each of the powders in Examples and Comparative Examples was subjected to a heating treatment at 200° C. for 24 hours in an air atmosphere. Then, the filling property of the powder after the heating treatment was evaluated again. The evaluation results are shown in Table 2.

5.2. Tapping Property

In a 50 mL screw cap bottle, 50 g of each of the powders in Examples and Comparative Examples was charged. Then, the screw cap bottle was struck on a desk for 10 times.

Thereafter, with the screw cap bottle being erected, a height from a bottom surface to an upper surface of the powder was measured, and a tapping property of the powder was evaluated according to the height. This tapping property was evaluated in light of the following evaluation criteria.
A: The height is 19 mm or less.
B: The height is more than 19 mm and 25 mm or less.
C: The height is more than 25 mm.
The evaluation results are shown in Table 2.

5.3. Aggregation Property

In a 50 mL screw cap bottle, 50 g of each of the powders in Examples and Comparative Examples was charged. Then, the screw cap bottle was rotated for 10 times around an axis passing through a center of a bottom surface of the screw cap bottle. Thereafter, an aggregation state of the powder was observed from an outside of the screw cap bottle, and an aggregation property of the powder was evaluated according to the aggregation state. This aggregation property was evaluated in light of the following evaluation criteria.
A: Aggregation
C: No aggregation
Next, each of the powders in Examples and Comparative Examples was subjected to a heating treatment at 200° C. for 24 hours in an air atmosphere. Then, the aggregation property of the powder after the heating treatment was evaluated again. The above evaluation results are shown in Table 2.

5.4. Changes in Bulk Density and Tap Density Accompanying Heating Treatment

A bulk density of each of the powders in Examples and Comparative Examples was measured by the method for measuring the apparent density of the metal powder specified in JIS Z 2504:2012. Next, each of the powders in Examples and Comparative Examples was subjected to a heating treatment at 200° C. for 24 hours in an air atmosphere. Next, the bulk density and the tap density of the powder after the heating treatment were measured again. Then, measured values were evaluated in light of the above-described evaluation criteria. The evaluation results are shown in Table 2. A decrease rate in the following evaluation criteria is a value obtained by dividing a change amount of the bulk density or the tap density before and after the heating treatment by the bulk density or the tap density before the heating treatment.
Evaluation Criteria of Change in Bulk Density Accompanying Heating Treatment
A: The decrease rate due to the heating treatment is 1.0% or less.
B: The decrease rate due to the heating treatment is more than 1.0% and 2.5% or less.
C: The decrease rate due to the heating treatment is more than 2.5%.

Evaluation Criteria of Change in Tap Density Accompanying Heating Treatment
A: The decrease rate due to the heating treatment is 2.5% or less.
B: The decrease rate due to the heating treatment is more than 2.5% and 5.0% or less.
C: The decrease rate due to the heating treatment is more than 5.0%.

5.5. Bending Stress of Additively Manufactured Body

An additively manufactured body having a rectangular parallelepiped shape was prepared using each of the powders in Examples and Comparative Examples by a binder jet method. The prepared additively manufactured body had a length of 40 mm, a width of 20 mm, and a thickness of 6.6 mm. An aqueous polyvinyl alcohol solution was used as the binder solution.
Next, a bending load of the prepared additively manufactured body was measured using a three-point bending test jig. Then, a bending stress σ of the additively manufactured body was calculated according to the following equation.

$$\sigma = \frac{3FL}{2bh^2}$$

In the above equation, F is a bending load, L is a distance between fulcrums of the three-point bending test jig, b is the width of the additively manufactured body, and h is the thickness of the additively manufactured body.
In the preparation of the additively manufactured body, additively manufactured bodies in which the used amount of the binder was changed to 70 mass % and 100 mass % of the metal powder were prepared, and the bending stress σ was calculated for each additively manufactured body. The calculation results are shown in Table 2.

5.6. Dimensional Accuracy of Additively Manufactured Body

An additively manufactured body having a rectangular parallelepiped shape was prepared using each of the powders in Examples and Comparative Examples by a binder jet method. Next, dimensions of the additively manufactured body were measured. Then, a deviation of the dimension from a target value was calculated, and a ratio of the deviation to the target value was defined as the dimensional accuracy. In the preparation of the additively manufactured body, additively manufactured bodies in which the used amount of the binder was changed to 70 mass %, 85 mass %, and 100 mass % of the metal powder were prepared, and a dimensional accuracy was calculated for each additively manufactured body. The calculation results are shown in Table 2. In the dimensional accuracy, a minus value indicates that the dimension is smaller than a target value, and a plus value indicates that the dimension is larger than the target value.

TABLE 2

| | Evaluation result of additive manufacturing powder | | | | | | |
|---|---|---|---|---|---|---|---|
| | Before heating treatment | | | After heating treatment | | | |
| | Filling property | Tapping property | Aggregation property | Filling property | Aggregation property | Change in bulk density | Change in tap density |
| Example 1 | A | A | A | A | A | A | A |
| Example 2 | A | A | A | A | A | A | A |
| Example 3 | A | A | A | A | A | A | A |

TABLE 2-continued

| | | | | | | | |
|---|---|---|---|---|---|---|---|
| Example 4 | A | A | A | B | A | A | B |
| Example 5 | A | A | A | A | A | A | A |
| Example 6 | A | A | A | A | A | A | A |
| Comparative Example 1 | C | B | C | C | C | C | C |
| Comparative Example 2 | A | A | A | B | A | B | B |
| Comparative Example 3 | A | A | A | B | A | B | B |
| Comparative Example 4 | B | A | A | B | A | B | B |
| Comparative Example 5 | B | A | A | B | A | B | B |
| Comparative Example 6 | A | A | A | B | A | B | B |
| Comparative Example 7 | A | A | A | B | A | B | B |

| | Evaluation result of additively manufactured body | | | | |
|---|---|---|---|---|---|
| | Bending stress Used Amount of binder | | Dimensional accuracy Used Amount of binder | | |
| | 70% N/cm$^2$ | 100% N/cm$^2$ | 70% % | 85% % | 100% % |
| Example 1 | 23 | 64 | −0.1 | 0 | 0.3 |
| Example 2 | 22 | 62 | −0.3 | 0.1 | 0.4 |
| Example 3 | 19 | 50 | −0.8 | 0.4 | 0.5 |
| Example 4 | 18 | 47 | −0.9 | 0.6 | 0.9 |
| Example 5 | 25 | 70 | −0.2 | −0.1 | 0.2 |
| Example 6 | 27 | 72 | −0.1 | 0 | 0.2 |
| Comparative Example 1 | 11 | 20 | −3.4 | 3.4 | 4.1 |
| Comparative Example 2 | 13 | 36 | −2.5 | 2.4 | 3.5 |
| Comparative Example 3 | 14 | 40 | −2.3 | 2.2 | 3.2 |
| Comparative Example 4 | 15 | 41 | −1.8 | 1.7 | 2.6 |
| Comparative Example 5 | 16 | 42 | −1.6 | 1.5 | 2.4 |
| Comparative Example 6 | 13 | 35 | −1.5 | 1.4 | 2.3 |
| Comparative Example 7 | 12 | 32 | −2.3 | 2.1 | 3.2 |

As shown in Table 2, each of the additive manufacturing powders in Examples has a better tapping property than that of the additive manufacturing powders in Comparative Examples, and also has a better filling property and aggregation property both before and after a heating treatment. In each of the additive manufacturing powders in Examples, change rates in the bulk density and the tap density are kept small before and after the heating treatment.

From the above, it is presumed that the additive manufacturing powder according to the present disclosure can improve the filling property when leveled into layers. The reason why such an effect is obtained is that, in each of the additive manufacturing powders in Examples, even after the heating treatment, the contact angle of water is within a predetermined range, and good hydrophobicity is maintained.

It is found that, by using each of the additive manufacturing powders in Examples, an additively manufactured body having a large bending stress and a high dimensional accuracy can be prepared. In particular, in each of the additive manufacturing powders in Examples, compared to each of the additive manufacturing powders in Comparative Examples, a decrease in the bending stress and the dimensional accuracy is small even when the used amount of the binder is small.

Figure 14:
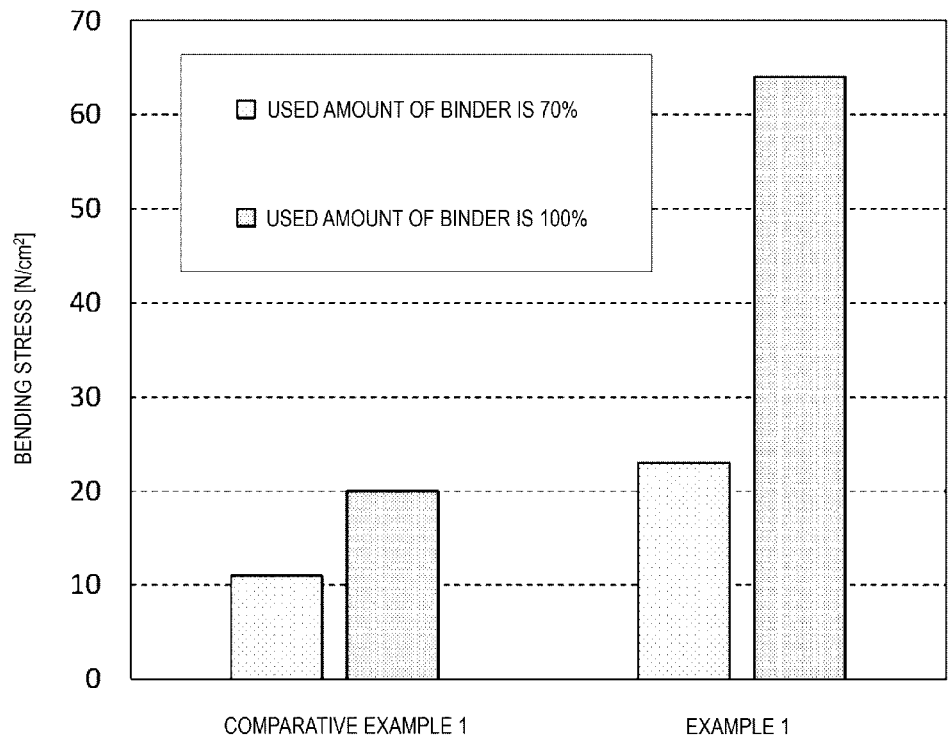
FIG. 14 is a graph comparing a bending stress of an additively manufactured body prepared using a powder in Example 1 and a bending stress of an additively manufactured body prepared using a powder in Comparative Example 1 among measurement results of bending stresses shown in Table 2.

Here, among the measurement results of the bending stress shown in Table 2, a comparison result between the bending stress of the additively manufactured body prepared using the powder in Example 1 and the bending stress of the additively manufactured body prepared using the powder in Comparative Example 1 is shown in a graph in FIG. 14.

As shown in FIG. 14, the bending stress of the additively manufactured body prepared using the additive manufacturing powder in Example 1 exceeds the bending stress of the additively manufactured body prepared using the additive manufacturing powder in Comparative Example 1 even when the used amount of the binder is reduced to 70%. Therefore, in each of the additive manufacturing powders in Examples, it is possible to reduce the used amount of the binder while maintaining the bending stress of the additively manufactured body.

In each of the additive manufacturing powders in Examples, the moisture content is kept small. Further, in each of the additive manufacturing powders in Examples, the value of (D90−D10)/D50 indicating the degree of expansion of the particle size distribution is kept small. It is presumed that these properties also contribute to a good mechanical strength and dimensional accuracy of the additively manufactured body.

Figure 15:
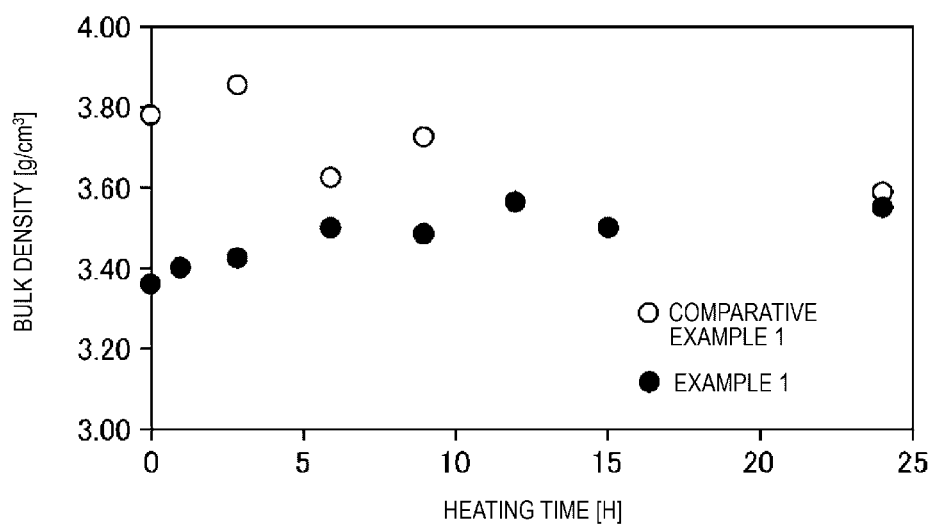
FIG. 15 is a graph showing a relationship between a heating time and a bulk density of each of the powder in Example 1 and the powder in Comparative Example 1.

When a time of the heating treatment described above was changed, a change in the bulk density of the powder was measured. The measurement results are shown in FIG. 15. FIG. 15 is a graph showing a relationship between the heating time and the bulk density of each of the powder in Example 1 and the powder in Comparative Example 1, in which the horizontal axis represents the time in the heating treatment (heating time) and the vertical axis represents the bulk density.

As shown in FIG. 15, in the powder in Example 1, even when a treatment time of the heating treatment is long, a decrease in the bulk density is prevented, and rather, the bulk density is increased. Therefore, it can be found that, in the powder in Example 1, even when the powder placed in a high temperature environment is repeatedly reused, the fluidity is less likely to decrease. On the other hand, it can be found that, in the powder in Comparative Example 1, since the bulk density decreases depending on the heating time, the fluidity is likely to decrease when the powder is placed in a high temperature environment. The powders in other Examples and the powders in other Comparative Examples also show the same tendencies as the powder in Example 1 and the powder in Comparative Example 1.

From this, it is recognized that the additive manufacturing powder according to the present disclosure maintains good fluidity and a good filling property even when placed in a high temperature environment, and is suitable for reuse.

What is claimed is:

1. An additive manufacturing powder comprising:
   a metal powder containing a plurality of particles, each particle having a core formed of a metal; and
   a film provided on a particle surface of the core and containing a compound derived from a coupling agent having a hydrophobic functional group,
   wherein the hydrophobic functional group is a cyclic structure-containing group or a fluoroaryl group, the cyclic structure being a cyclic ether group,
   a moisture content measured by a Karl Fischer method is 150 ppm or less in terms of mass ratio,
   an average particle diameter is 3.0 μm or more and 30.0 μm or less,
   a contact angle of water measured at 25° C. by a θ/2 method, in a state where the additive manufacturing powder is subjected to a heating treatment at 200° C. for 24 hours in an air atmosphere and then laid in layers, is 80° or more and 150° or less, and
   the compound is bonded to an oxygen atom that is directly bonded to the metal of the core.

2. The additive manufacturing powder according to claim 1, wherein
   when the additive manufacturing powder is heated at 200° C. for 24 hours in an air atmosphere, a decrease rate in bulk density is 2.5% or less with respect to a bulk density before heating.

3. The additive manufacturing powder according to claim 1, wherein the film is a monomolecular film containing the compound.

4. The additive manufacturing powder according to claim 1, wherein
   when additive manufacturing is performed using a water-soluble resin as a binder, a bending stress of an obtained additively manufactured body is 15 N/cm2 (0.15 MPa) or more.

5. An additively manufactured body comprising:
   the additive manufacturing powder according to claim 1; and
   a binder that binds particles of the additive manufacturing powder to each other.

* * * * *